Patented Sept. 10, 1940

2,214,326

UNITED STATES PATENT OFFICE 2,214,326

PROTECTION OF VEGETATION

Kenneth Gregory, Watsonville, Calif., assignor to California Spray-Chemical Corporation, Richmond, Calif., a corporation of Delaware No Drawing. Application January 21, 1938, Serial No. 186,187

9 Claims. (Cl. 167—49)

This invention pertains primarily to the protection of vegetation from crawling insects such as ants, aphids, coddling moth larvae, mealy bugs and the like, and more particularly to improved compositions for effecting such protection, and for the entanglement and entrapment of insects generally.

It has long been known to apply a band of tar, crude oil, rosin compositions, semi-drying oils, and the like around the trunks of trees and shrubs in order to protect the twigs, leaves and fruit from attack by insects which gain access thereto by crawling from their nests or points of origin in the surrounding ground. These compositions, however, have been unsatisfactory for widespread usage for a number of reasons, the first and probably most important of which has been the damage caused by the compositions to all except the most hardy vegetation. More or less serious objection has also arisen from the unsightly appearance caused by the aforesaid banding materials due to their fluidity and hence their tendency to run down irregularly from the point of original deposition. Their tendency to form surface films, due to oxidation, which films interfere with their ability to entangle and hold the insects, has also detracted materially from the utility of such hitherto known agents. These compositions, accordingly, due both to film formation and fluidity have required replacement at frequent intervals in order to provide anything like continual protection to the growing vegetation.

It is the broad object of the present invention to provide compositions for use in banding trees and the like which retain their adhesive properties unaltered for long periods of time in service.

It is a further object of the invention to provide tree banding materials which are entirely harmless to growing vegetation.

It is a still further object of the invention to provide banding compositions which are extremely tacky at low temperatures and yet are not fluid at even the highest usual atmospheric temperatures.

Still other objects of the invention will be readily apparent from the following description and discussion.

In its broadest aspect my invention consists in rendering a tacky viscous oil of the olefine-polymer type resistant to flow by incorporating therein one or more agents adapted to produce a bodying and/or jelling effect.

It is now common knowledge in the petroleum industry that oils of almost any desired viscosity may be prepared from the normally gaseous and low molecular weight liquid olefines by polymerization with well known polymerization catalysts such as aluminum chloride, sulfuric acid, boron fluoride and the like at temperatures usually somewhat below atmospheric. As might be expected, the olefine-polymer oils so produced will differ somewhat according to the olefine polymerized and the catalyst and conditions of polymerization. In general, however, they are extremely sticky oils of relatively high molecular weight and viscosity, depending upon the extent to which the polymerization reaction is carried.

For the purpose of my invention specific differences between individual oils of the olefine-polymer type are of far less significance than the differences existing between this type of oil and any other type of oil with which I am familiar. The peculiar and significant characteristics of these oils in the practice of my invention will be fully discussed in a later paragraph.

A large number of bodying agents for use with the viscous polymer oils in producing desirable banding compositions have been studied over a considerable period of time. I have found that many waxes such as montan, carnauba, Japan, candelilla, paraffine, beeswax and several synthetic waxes when used in the proper proportions produce the desired bodying and stiffening effect to a greater or less degree. For the best effect I desire a wax that possesses sufficient solubility in the oil that it will not crystallize out on cooling and standing but which solubility is sufficiently of the colloid type to result in forming a delicate cellular structure in the oil resulting in the jelling tendency described.

Other substances which produce the desired bodying effect are the metal soaps of the ordinary fatty acids. The polyvalent metal soaps of magnesium, calcium, aluminum and the like with fatty acids of about 16 to 18 carbon atoms, when properly incorporated in the oil, are useful in this regard. The alkali metal soaps such as sodium oleate, while less soluble in oils generally than soaps of the polyvalent metals, have been found to be unexpectedly well adapted to my present use. In general, from 5 to 15% of soap depending upon the particular individual employed will be found to give a product of the proper consistency.

Other materials which possess no appreciable solubility in the oil but which are readily wetted by oil may be used to advantage in certain instances. Among the materials of this class which I have tested are lampblack, ochre, fullers earth, etc. Since the bodying effect with such materials is of a somewhat different nature than with appreciably soluble substances a greater proportion is in general necessary. In the case of lampblack I have found that 12% based on the oil is about the proper amount, with ochre about 25 to 28% and with clay 30 to 40%. It will readily be understood that with these materials the composition resulting is more in the nature of a paste or putty than a jel as with the organic type bodying agents previously described the significant point being, however, that they are very resistant to flow at even high atmospheric temperatures and yet exhibit the extreme tackiness of the oil substantially undiminished for entangling and holding the insects.

In many instances where exactly the right agent cannot be found to give the particular combination of characteristics desired, agents of different classes may be used such, for instance, as wax and soap or soap and clay. In one instance it was found that 7½% of sodium oleate and 2½% of a purified montan wax gave a composition of very desirable characteristics for a particular application.

While as hereinbefore set forth viscous oils of the olefine-polymer type varying widely in viscosity, viscosity index and molecular weight are available and satisfy the broad objects of my invention, when properly compounded with an appropriate bodying agent, I have found that it will seldom be desirable to employ an oil of viscosity lower than about 1000 seconds S. U. at 210° F. and that for most purposes a viscosity of 3000 S. S. U. or above will be of advantage due to its greater tackiness and the smaller quantity of bodying agent required to give the desired consistency and resistance to flow. I have found one olefine-polymer oil marketed by the Standard Oil Company of California as Viscous Oil #32 to be particularly well suited to my purpose. This oil is prepared by the selective polymerization of iso-butene and has an average molecular weight of about 1280, a viscosity at 210° F. of about 3000 and a viscosity index of from 100 to 120. While the high viscosity, extreme tackiness, lack of color and extreme unreactivity of this oil all contribute to its desirability for my purpose its relatively high resistance to viscosity change with temperature, as indicated by its high viscosity index, is believed to contribute materially to the production of compositions of the very low susceptibility to flow which I desire for use in hot climates.

Likewise, while I have described a number of bodying agents which alone or in combination produce a useful degree of bodying or jelling in a viscous oil of the olefine-polymer type, I have found a wax which is sold as "I. G.-Wax S" and designated by the manufacturers as a "bleached montan wax" to be most satisfactory in every respect. This wax has a melting point of 180° to 185° F., an acid number of 140, is pale yellow in color and is soluble to the extent of 5 to 10% in a viscous polymer oil, of the type described, at 210° to 220° F.

In preparing a preferred composition of #32 oil and wax S I heat the oil to 210° to 220° F. and then add 2½ to 5% of the wax with continued agitation allowing sufficient time for complete incorporation. When solution is completed the product is transferred while hot directly to the containers from which it is to be used since I have found that when waxes or soaps are employed as the thickening agents any stirring or working of the product after it has "set" tends to break the "body" and produce a more fluid material.

In applying the product of this invention to vegetation a narrow band is spread, with as little mechanical working as possible, across the path of the insects and between their point of origin and their point of attack as for instance around the trunks or main limbs of trees, around the stalk or canes of grapevines, rose bushes and the like. For convenience in application the material may be absorbed in gauze, cloth, absorbent paper, twine, rope or other carrier which is then affixed to the vegetation to be protected in any well known manner. It is, however, one of the features of my invention that no carrier is necessary to prevent contact with and thus provide protection for the vegetation banded as has been the case with many of the banding materials of the prior art.

One extremely important characteristic of the compositions of my invention arises from the substantially complete unreactivity of the olefine-polymer type of oil employed. Thin films of these oils have been continuously exposed to air and light under normal atmospheric conditions for periods of over two years without evidence of any change whatsoever which would interfere with their ability to adhere to and hold insects. This stability makes possible a product which is so permanent that were it not for the inevitable accumulation of dust, dead insects and the like one application would afford ample protection for a whole growing season. Even such unavoidable interference is less of a problem with my compositions employing the viscous-polymer oils than with hitherto used preparations due to the ability of these oils to encompass very large quantities of foreign materials and still exhibit a surface which is adequately sticky or tacky to trap and hold the insects. Due to this unusual characteristic it is seldom necessary to make more than two applications of my compositions during the average growing season whereas with hitherto known compositions for this same service film formation alone has required renewal every few weeks in order to provide adequate protection to the vegetation.

An even more outstanding advantage in my compositions resides in the entire phytonomic character of the olefine-polymer oils which makes possible the extension of this type of protection to all kinds of vines, trees, cuttings, shrubs and even to many very tender greenhouse plants.

While a product of light color is desired by most users and especially for use on edible and ornamental crops and for that reason I prefer to employ the relatively light colored thickening agents hereinbefore described, such as the purified waxes and soaps, for other uses color is of relatively little significance and the darker waxes and even lampblack are not objectionable.

While as hereinbefore indicated the major application of my compositions, in which an oil of the viscous, non-drying, olefine-polymer type is bodied and rendered more or less plastic by an appropriate bodying agent, is in banding the trunks or stalks of growing vegetation it will be readily appreciated that they will find considerable utility in other circumstances. For instance I have found that they may be used to protect grafts and other fresh cuts or wounds of trees and shrubs against the entry of fungus spores and undesirable foreign material generally. They may also be employed to entangle and entrap insects and small crawling pests in locations other than on growing vegetation. It will be clearly apparent that in such uses it may not be necessary to maintain the material on a vertical surface and hence a more fluid product may be employed.

In the use of my materials on substantially horizontal surfaces and in the preparation with it of insect entrapping sheets similar to the well known sticky fly papers only a very small proportion of bodying agent may be necessary or none at all if the polymer oils employed are of sufficient viscosity as for instance 3000 to 5000 S. S. U. or above at 210° F.

Having now described my invention as comprehending compositions comprising the viscous, non-drying, olefine-polymer type of oils generally and useful in various ways in the protection of vegetation and/or the entanglement and entrapment of insects it is to be understood that the term "tree banding composition" is to be read in that broad sense. It is also to be understood that while I have particularly described compositions comprising an olefine-polymer oil of about 3000 S. S. U. viscosity at 210° F. and relatively high viscosity index and a purified montan wax as the bodying agent such preferred composition is to be taken as illustrative of rather than limiting my invention. It is further to be understood that while I have described and illustrated several classes of bodying agents useful in rendering viscous olefine-polymer oils more or less plastic for the purposes outlined, other bodying agents producing an equivalent effect will be readily apparent to those skilled in the art and are comprehended within the spirit of my invention.

I claim:

1. A tree banding composition which is substantially non-fluid at high atmospheric temperatures, very sticky at all temperatures at which insects are active and substantially non-film-forming on long continued exposure to the atmosphere, comprising a phytonomic non-drying olefine-polymer oil of viscosity above about 1000 S. S. U. at 210° F. having a bodying agent dissolved therein said agent consisting of a wax which does not crystallize from the oil on long standing.

2. A tree banding composition which is substantially non-fluid at high atmospheric temperatures, very sticky at all temperatures at which insects are active and substantially non-film-forming on long continued exposure to the atmosphere comprising a phytonomic non-drying olefine-polymer oil of viscosity above about 1000 S. S. U. at 210° F. having a bodying agent consisting of a fatty acid soap disposed therein in such manner that it does not separate on long standing.

3. A tree banding composition which is substantially non-fluid at high atmospheric temperatures, very sticky at all temperatures at which insects are active and substantially non-film-forming on long continued exposure to the atmosphere comprising a phytonomic non-drying olefine-polymer oil of viscosity above about 1000 S. S. U. at 210° F. having a bodying agent consisting of a substantially insoluble preferentially oil-wetted absorbent powder highly dispersed therein.

4. A new composition of matter comprising a phytonomic non-drying olefine-polymer oil of viscosity above about 1000 S. S. U. at 210° F. having dissolved therein a wax selected from the group consisting of carnauba, candelilla, montan, palm and japan.

5. A new composition of matter comprising a phytonomic non-drying olefine-polymer oil of viscosity above about 1000 S. S. U. at 210° F. having from a fraction to about 5% of montan wax dissolved therein.

6. A new composition of matter comprising a liquid non-drying phytonomic olefine-polymer oil of extreme stickiness having a viscosity of about 3000 S. S. U. at 210° F. having from a fraction to about 5% of carnauba wax dissolved therein.

7. A tree banding composition comprising a viscous liquid non-drying phytonomic olefine-polymer oil of extreme stickiness and of a viscosity above about 1000 S. S. U. at 210° F. and a bodying agent effective to impart to said viscous liquid oil the property of non-fluidity at high atmospheric temperatures without substantially reducing its stickiness at any temperature at which insects are active so that the composition may be retained with substantially no flow on vertical surfaces of growing vegetation and entrap insects crawling thereon.

8. A tree banding composition comprising a viscous liquid non-drying phytonomic olefine-polymer oil of extreme stickiness and of a viscosity above about 1000 S. S. U. at 210° F. and less than about 40% of a bodying agent effective to impart to said viscous liquid oil the property of non-fluidity at high atmospheric temperatures without substantially reducing its stickiness at any temperatures at which insects are active so that the composition may be retained with substantially no flow on vertical surfaces of growing vegetation and entrap insects crawling thereon.

9. A tree banding composition comprising a major proportion of a liquid non-drying phytonomic olefine-polymer oil of extreme stickiness having a viscosity above about 1000 S. S. U. at 210° F. and a minor proportion of a bodying agent effective to impart to said viscous liquid oil the property of non-fluidity at high atmospheric temperatures without substantially reducing its stickiness at any temperature at which insects are active so that the composition may be retained with substantially no flow on vertical surfaces of growing vegetation and entrap insects crawling thereon.

KENNETH GREGORY.